M. R. PARKER, JR 3,562,676
FOLDED PATH PERPENDICULAR DIFFRACTION DELAY LINE
Filed Dec. 18, 1967 2 Sheets-Sheet 1
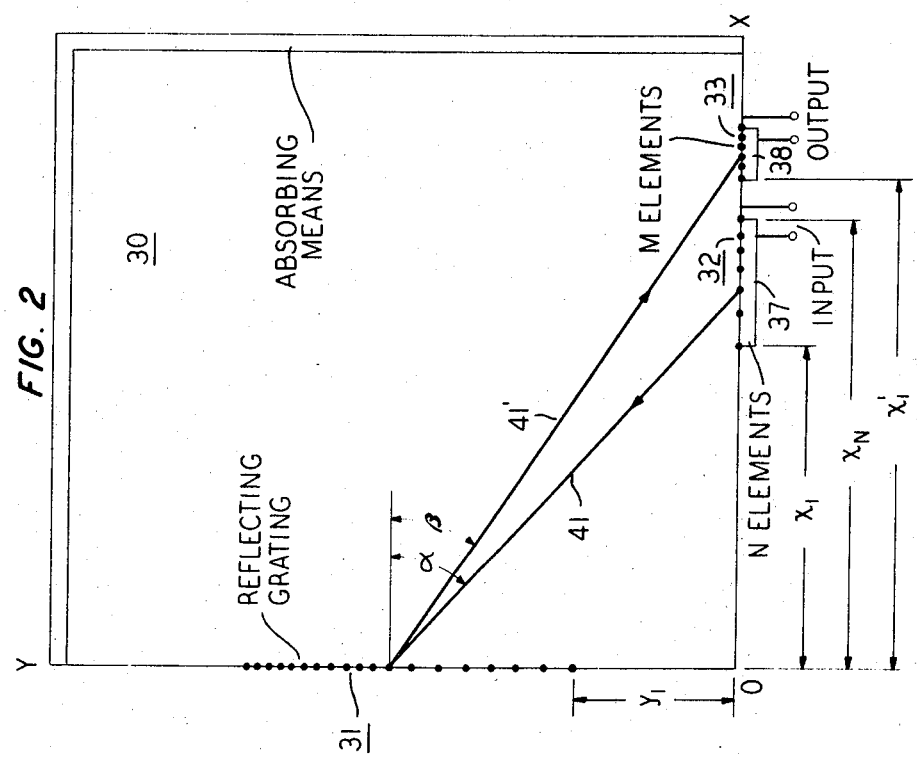
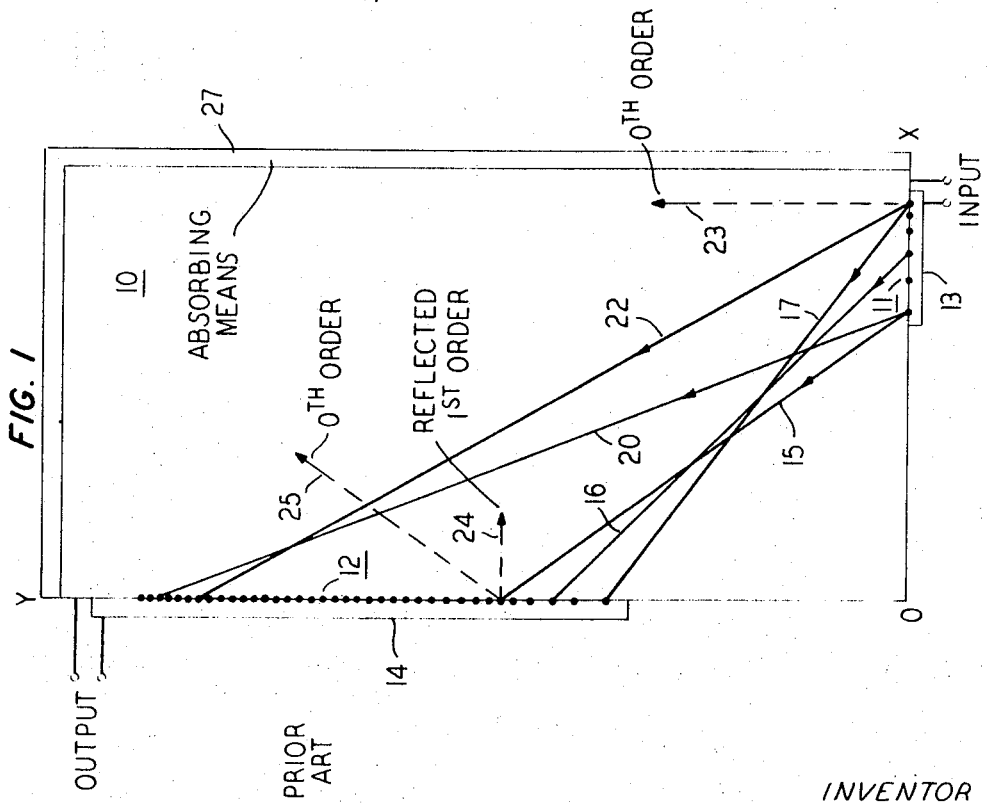
INVENTOR
M. R. PARKER, JR.
BY
ATTORNEY United States Patent Office 3,562,676
Patented Feb. 9, 1971

3,562,676
FOLDED PATH PERPENDICULAR DIFFRACTION DELAY LINE
Marsena R. Parker, Jr., Matawan, N.J., assignor to Bell Telephone Laboratories, Incorporated, Murray Hill and Berkeley Heights, N.J., a corporatiion of New York
Filed Dec. 18, 1967, Ser. No. 691,304
Int. Cl. H03h 7/30
U.S. Cl. 333—30                                       7 Claims

ABSTRACT OF THE DISCLOSURE

An intermediary graded grating is positioned in the beam path between the input and output graded gratings usually found in a perpendicular diffraction delay line. The intermediary grating intercepts the beams and rediffracts desired orders of them to the output grating at angles different from their angles of incidence without loss of the inherent averaging properties of the perpendicular diffraction delay line. The intermediary grating may be either reflecting or transmitting.

BACKGROUND OF THE INVENTION

This invention relates to frequency selective systems for elastic wave energy and more particularly to simple delay line structures having a frequency dependent delay characteristic and employing the principles of diffraction gratings.

Elastic wave dispersive delay lines; i.e., those having a delay that varies according to some function of frequency, are well known and their usefulness in numerous applications is recognized. In dispersive delay lines using diffraction gratings, the grating is illuminated by a nondispersive elastic wave. Dispersion is effected by a change in path length with frequency. The perpendicular type of diffraction delay line is fully disclosed in "The Perpendicular Diffraction Delay Line: A New Kind of Ultrasonic Dispersive Device," by R. S. Duncan and M. R. Parker, Proceedings of the IEEE, April 1965, page 413. This configuration provides linear frequency modulation or linear variation of delay time with frequency and is especially well suited for use in chirp type pulse compression radar systems.

The essential features of a perpendicular diffraction delay line are the input and output arrays which are positioned perpendicularly to each other in or on a block of propagating material. Each array is a graded series of discontinuities to elastic wave energy, i.e., a series of elements, which act as diffraction obstacles to elastic wave energy, separated by suitable graduated nonuniform spaces. The input and output arrays are associated respectively with a means for launching and receiving elastic wave energy, such as a series of individually spaced transducers or a single continuous transducer. Conventionally, diffraction gratings are formed on the face of a single piezoelectric transducer of appropriate resonant frequency which is bonded to the propagating material.

The perpendicular diffraction delay line provides a set of nonparallel paths for each frequency within its bandwidth. The length of a path from input to output differs for beams in different frequency sets and all paths in a single frequency set have an identical path length. Therefore, a distinct delay defined by the path length is determined for each frequency. The received energy at a given frequency is a combination of the energy content of the plurality of beams in that frequency set. The redundancy of paths for each operating frequency contributes to a reduction of errors due to inaccuracies in grating placement, inhomogeneities in the delay medium and the like. This redundancy characteristic of a perpendicular diffraction delay line is known as averaging and it distinguishes the perpendicular diffraction delay line from other diffraction delay lines where a single beam is propagated for each frequency.

For purposes of comparison with the present invention it should be noted that in the perpendicular delay line the number of paths exactly in phase at any given frequency is limited by the number of elements in the smaller of the two arrays. Therefore, in order to provide a high degree of redundancy of beam paths, the smaller of the graded arrays must contain a very large number of elements. This necessitates a relatively long array with minute spacings at the fine end. The grating-transducer may provide far finer spacings than an array composed of individual transducers, but a long graded grating requires a single long and costly transducer which in turn creates high electrical capacitance. This puts considerable strain upon methods of fabricating gratings and transducers.

The fabricating problems are magnified significantly because the larger of the arrays must be substantially longer than the smaller array in order to provide a broad bandwidth. Low frequency beam paths impinge on one portion of the larger array and successively higher frequencies cause illumination of successive portions of the array.

In addition to the difficulties in fabrication due to the requirements of large arrays, difficulties arise in regard to the size of the block of propagating material. Since the delay time is a direct function of path length and the beams travel along straight line paths, the propagating material must be a single block of relatively large dimensions for significant delay. A device designed to operate within the 60 to 90 mHz. frequency range comprises, for example, a block of material approximately 335 millimeters by 164 millimeters with an output transducer approximately 208 millimeters long and an input transducer approximately 38 millimeters long. The necessity for obtaining large block and long transducers in single pieces makes such a delay line extremely expensive. In addition, the resulting high transducer capacitance necessitates operation at inconveniently low impedance levels.

SUMMARY OF THE INVENTION

In accordance with the present invention, a diffraction delay line is obtained with the redundancy properties of a perpendicular diffraction delay line at greatly reduced per unit cost. The size of the delay line is reduced by folding the beam paths thus increasing the lengths of beam paths relative to the dimensions of the block of propagating material. An intermediary graded diffraction grating is positioned to intercept incident diffracted beams and rediffract them.

Rediffraction is not equivalent to redirection. A reflecting or refracting surface which redirects incident beams would also bend the beams and hence increase the relative length of the beam paths, but each incident beam would produce a single redirected beam. The portion of the intermediary diffraction grating which is illuminated by incident beams can be thought of as a secondary beam source. It provides sets of frequency directed beams for each diffracted beam incident upon it and thus contributes to additional redundancy of beam paths.

Since the total dispersion is the sum of the dispersion in each of the parts of the line, smaller transducer-gratings mounted in a folded configuration on a smaller block of propagating material can provide the same dispersion and bandwidth as is provided by a larger unfolded configuration. The folded line substitutes a relatively inexpensive intermediary grating and small input and output arrays for the very large and costly conventional input and output arrays. In addition to these advantages of greater compactness of construction, smaller gratings and transducers, lower insertion loss and the resulting reduction in cost, the folded path line provides a higher level of redundancy of beam paths than the unfolded line.

Whereas the unfolded delay line provides a number of exactly inphase beam paths approximately equal to the number of elements in the smaller array, the number of exactly inphase redundant paths for a folded line with one fold is the product of the number of elements in the input and output arrays. Folded lines can be designed with many fewer elements in each array, but yet the product of the number of elements in the input array and the number of elements in the output array will still exceed the number of elements in the smaller array of the unfolded line.

Folded lines can be designed to operate with equal angles of diffraction and incidence such as is disclosed in copending patent application, Ser. No. 691,453, E. K. Sittig, filed on even date herewith. To maintain isolation of the input and output transducers, the intermediary grating must be positioned within the material between the two transducers and operate in a transmitting mode so that the diffracted incident beams and the rediffracted beams lie on opposite sides of the intermediary grating.

In accordance with the present invention, an intermediary grating is proportioned to rediffract beams at an angle different from the angle of incidence. Further advantages are derived therefrom. A reflecting intermediary grating can be used instead of a transmitting intermediary type. This further reduces fabrication costs since the reflecting grating is easily formed upon an exposed edge of the block of propagating material.

The input and output gratings may be mounted on a single edge of the block of propagating material on the same side of the intermediary grating if a reflecting grating is used. The input and output arrays may in fact be constructed simultaneously at an additional cost savings over the two separate operations required in the unfolded delay lines and the folded variety having equal angles of incidence and diffraction and a transmitting intermediary grating.

It is an object of the present invention to provide a diffraction delay line which is simpler and less expensive than the perpendicular diffraction delay line. This objective is met by utilizing an intermediary grating which intercepts the diffracted beams propagating from the input grating and selectively rediffracts them to the output grating at an angle different from the beams' angles of incidence. The incident beams and the rediffracted beams in the reflective mode are therefore not coincident and do not interfere with each other. Beam folding under these conditions permits the use of a reflecting intermediary grating, which can be inexpensively mounted to an exterior edge of the delay medium.

BRIEF DESCRIPTION OF THE DRAWINGS

The novel features of the invention will become apparent from the following detailed description taken in conjunction with the accompanying drawing in which:

FIG. 1 is a schematic representation of a conventional unfolded perpendicular diffraction delay line;

FIG. 2 is a schematic representation of a single fold perpendicular diffraction delay line in accordance with the present invention;

DETAILED DESCRIPTION

Figure 4:
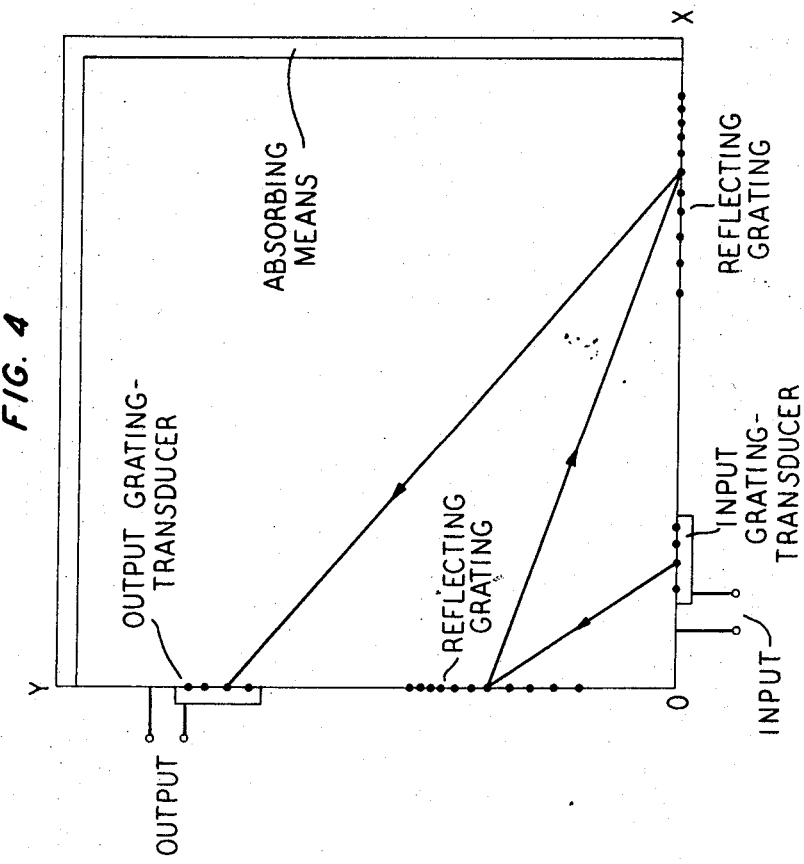
FIG. 4 is a schematic representation of a double fold perpendicular diffraction delay line in accordance with the present invention.

In order to understand the folded perpendicular diffraction delay line it is necessary to first understand the conventional unfolded perpendicular diffraction delay line. The perpendicular diffraction delay line is a device capable of spatially dispersing the frequency components of an elastic wave and converting the dispersion in space to a dispersion in time or, conversely, converting the time ordered frequency components of a signal into dispersed waves in space and collapsing the dispersed space waves into a relatively narrow pulse. The unfolded perpendicular diffraction delay line illustrated in FIG. 1 consists of two transducers 13 and 14 and two respectively associated graded gratings 11 and 12, distributed along the X and Y axes of propagating material 10. Though the line is reciprocal, assume for example, that a multifrequency input signal is introduced at transducer 13. Grating 11 causes diffraction of the input signal in much the same way as an optical signal is diffracted by an optical diffraction grating.

Each frequency component of the input signal is propagated toward output grating 12 as a distinct set of beams, a low frequency first order set being indicated, for example, by lines 15 through 17 and a high frequency first order set by lines 20 through 22. Beams in a set are propagated along nonparallel paths such that the lengths of all paths in a set are identical. Different frequency components travel paths in different sets which are, of course, of different lengths, as illustrated for example by comparing lines 15 and 20. Since path length determines delay time, diffraction converted into dispersion in space results in dispersion in time. Output grating 12 is arranged to intercept diffracted beams and output transducer 14 combines all desired frequnecy components. In the collapse mode the operation is essentially the reverse, i.e., a signal having time ordered frequency components is merged into one pulse.

Dashed lines 23 through 25 represent examples of beam paths of diffraction order not utilized which must be absorbed by absorbing means 27 to prevent spurious signals. Herein, for purposes of explanation orders of diffraction are labeled relative to the diffracting grating and the specular diffraction is designated the zeroth order.

The design equations for a conventional perpendicular diffraction delay line are well known. The derivation of the defining laws, referred to as grating laws, is beyond the scope of this invention, but these laws are derived and fully described in "Theory and Performance of Perpendicular Diffraction Delay Lines," by G. A. Coquin and R. Tsu, Proceedings of the IEEE, June 1965, page 581.

In accordance with the grating laws for a conventional perpendicular diffraction delay line having graded gratings on two perpendicular edges of the propagating material, the spacing between the lines of each of the two perpendicular gratings is defined by $C_i = \bar{s}_i d_i$, where $C_i$ is the grating constant for the $i^{th}$ grating, $\bar{s}_i$ is a distance from the common origin to the midpoint between any two adjacent elements of the $i^{th}$ grating, and $d_i$ is the distance between those two adjacent elements. The grating constant is defined for a desired order of diffraction $p$, bandwidth $\Delta f$ and delay time dispersion, T, defined by $$T = t\Delta f/f$$

where $t$ is the day time at a frequency $f$ within $\Delta f$.

A set of beam paths corresponds to each discrete frequency within the bandwidth $\Delta f$. Since every path in a set has an identical length, the wave fronts of each beam in a set arrive simultaneously at output grating 12. This redundancy of beams carrying a single frequency, contributes to the reduction of error associated with any one frequency. This property of the perpendicular diffraction delay line is called averaging. For the wedge grating delay line disclosed in "Dispersion by Plane Wave Excitation of Piezoelectric Transducer Arrays," by D. E. Miller and M. R. Parker, Proceedings of the IEEE, June 1966, page 891, the number of paths contributing to the output at a distinct frequency whose beams are exactly in phase is approximately $1/p$, where $p$ is the diffraction order. The number of exactly inphase paths for a perpendicular diffraction delay line is approximately N, where N is the number of elements in the smaller of the gratings, for a frequency within the operating bandwidth of the device.

In accordance with the present invention, FIG. 2 shows, by way of example, a folded path perpendicular diffraction delay line in which intermediary graded grating 31 has been positioned in the beam paths between graded gratings 32 and 33. It is to be clearly understood that any array which provides a graded series of discontinuities to elastic wave energy would be suitable as long as the elements of the array are small compared to a wavelength. The elements of the array cause diffraction of the incident beams and produce frequency dependent directional propagation of relatively narrow beams of elastic wave energy.

Intermediary grating 31 is a mechanical diffraction grating whose elements provide mechanical discontinuities. It is remote from any transducer and effective to rediffract diffracted beams. Gratings 32 and 33 are associated respectively with transducers 37 and 38. Though the line is reciprocal, for purposes of discussion, transducer 37 with associated grating 32 will be arbitrarily referred to as the input, and transducer-grating 38–33 will therefore be referred to as the output.

It should be clearly understood that a suitable nongrating array and a launching means, whether two separate associated units or a single integrated unit, could be substituted for transducer-grating 37–32. Similarly, a suitable nongrating array could be associated with a suitable receiving means in place of transducer-grating 38–33.

The delay line is composed of a block 30 of appropriate propagating material, such as fused silica for operation in the 1 mHz. to 1 gHz. frequency range, which is equipped with transducer-grating combinations 37–32 and 38–33 and intermediary graded grating 31. Energy introduced at transducer-grating 37–32 is diffracted and propagated along multiple paths, such as path 41, rediffracted by intermediary grating 31, and propagated along paths such as path 41' toward transducer-grating 38–33. The plurality of multifrequency beams thus received are combined into an output signal.

The grating spacing of the three gratings 31, 32 and 33 are defined according to grating laws similar to those defining the unfolded perpendicular diffraction delay line. The grating constants for gratings 32, 31 and 33 are designated respectively $C_n$, $C_g$, $C_m$ where $n$ indicates the input grating, $g$ the intermediary grating and $m$ the output grating. In terms of a parameter, $k$, the grating constants are related as follows:

$$C_n = C_g(1+k) = kC_m \qquad (1)$$

The parameter $k$ is defined as the ratio of the sine of the angle of diffraction $\beta$ to the sine of the angle of incidence $\alpha$ of a beam impinging upon the intermediary grating, where the angles are measured between the normal to the grating and the appropriate beam path.

In the unfolded case, $C_m$ does not exist, as only two gratings are employed. Also in the unfolded case $k=0$ and therefore, a diffracted first order wave propagates normal to the plane of the grating.

If $0<k<1$, diffraction angle $\beta$ is less than incidence angle $\alpha$. Angle of diffraction $\beta$ increases from 0° to the angle of incidence as $k$ increases from 0 to 1. Thus, in the range $0<k<1$, since incident path 41 and rediffraction path 41' are not coincident, input grating 32 and output grating 33 can be positioned on the same edge of the block of propagating material and grating 31 may be a reflecting grating lying on the edge of the material perpendicular to gratings 32 and 33.

In general terms for a single fold perpendicular diffraction delay line having input and output gratings on the X axis and the intermediary grating on the Y axis, $k$ is determined by $$k = \frac{[K_p V f_L]^2 + [r^2 - 2rx_1'] - 2pV^2 K_p(M-1)}{[K_p V f_L]^2 - [r^2 - 2rx_1']} \qquad (2)$$

where $k_p = T/\Delta f$, V is the wave velocity in the medium, $f_L$ is the low frequency within the bandwidth $\Delta f$, $x_1'$ is the distance from the origin to the element of the output grating nearest the origin, M is the number of elements in the output grating, and $$r = |x_1'| - |x_N| \qquad (3)$$

where $x_N$ is the distance from the origin to the element of the input grating furthest from the origin. Thus, a given delay time dispersion T, frequency range $f_H$ to $f_L$ and order of diffraction $p$ determines a specific $k$ and hence a specific relationship between the angle of incidence and the angle of diffraction relative to the intermediary grating. The value of $k$ also determines a relationship between grating constants. The number and location of elements in input grating 32 are defined by the well known relationship $$N - 1 = \frac{x_N^2 - x_1^2}{2C_n} \qquad (4)$$

similar relationships exist for every other grating.

These equations define a family of single fold diffraction delay lines having both input and output on the X axis of an XY coordinate system. To distinguish one member of the family from all others, $x_N$, $x_1'$, and M must be selected. M and $x_1$ may be arbitrarily chosen so long as the input and output transducers are sufficiently separated to be mechanically and electrically isolated. Certain members of the family are, however, superior to others. It is usually desirable that unwanted diffraction orders be cut off. If $$x_N > \frac{kVK_p f_H}{2(k+1)} \qquad (5)$$

the second and all higher orders will be cut off. Choosing $$x_N < \frac{kVk_p f_L}{k+1} \qquad (6)$$

will assure that all elements of the intermediary grating lie on a single side of the origin.

Figure 3:
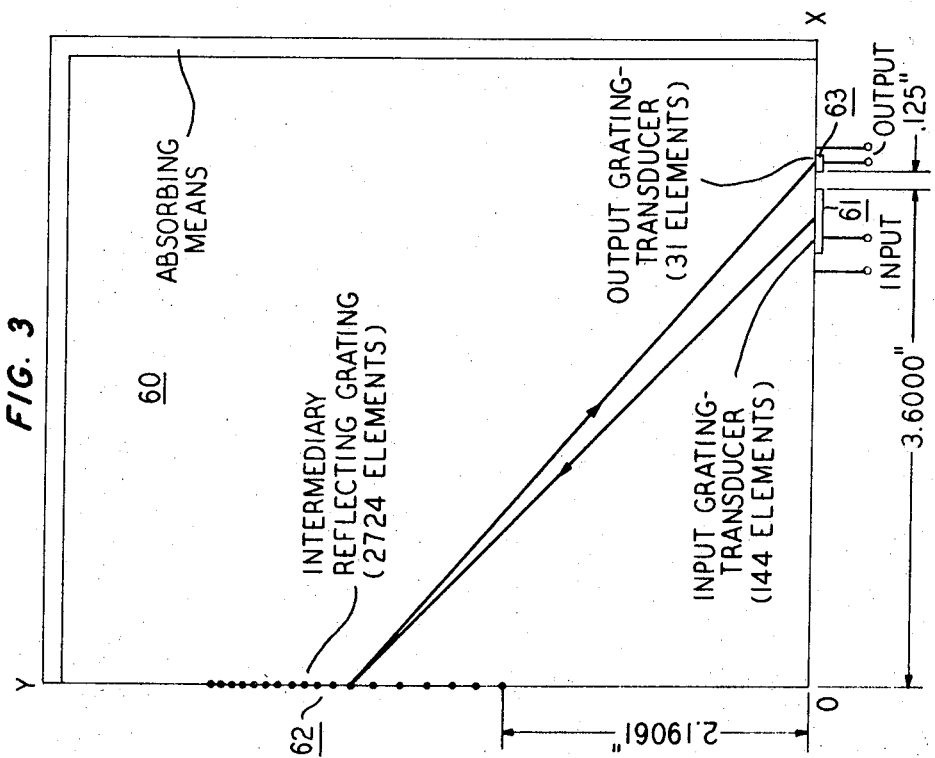
FIG. 3 is a schematic representation of a specific single fold perpendicular diffraction delay line.

Methods of fabricating a delay line in accordance with these design criteria are well known to those skilled in the art. By way of example, a specific folded delay line is illustrated in FIG. 3. It has been designed to operate in the first diffraction order in a propagating material of fused silica 60 which has a shear wave velocity $V=0.1485$ inch per microsecond, the frequency range is from $f_L=58$ mHz. to $f_H=92$ mHz. and the delay time dispersion $T=34$ microseconds. As is shown input and output transducer-gratings 61 and 63 respectively lie on the X axis and a reflecting intermediary grating 62 lies on the Y axis of an XY coordinate system. Input transducer-grating 61 has 144 elements, the last of which lies 3.6000 inches from the origin and has a grating constant of 0.01079. Output transducer-grating 63 contains 31 elements and is separated from input grating 61 by 0.1250 inch, the first element therefore being 3.7250 inches from the origin. It has a grating constant of 0.01126. An equivalent unfolded perpendicular diffraction delay line requires 625 input elements and 3176 output elements.

The reflecting intermediary grating 62 which facilitates this reduction in the number of elements, contains 2724 elements and has a grating constant of 0.00551. The first element is at a point 2.19061 inches from the origin. The finest spacing of the reflecting grating is 0.00093 inch, while the finest space on the input and output grating is roughly three times larger.

In the single fold configuration the number of paths combined in exact phase to the output signal at a distinct frequency is approximately the product of the number of elements in the input and the number of elements in the output or NM, where N and M are the number of elements in the input and output arrays respectively. An equivalent unfolded delay line would have a number of exactly inphase paths approximately equal to the number of elements in one array. The averaging characteristics of the folded delay line are therefore superior to those of the unfolded type, since the number of redundant beams carrying a single frequency can be made greater in a folded path delay line than in an equivalent unfolded structure even though there are fewer elements in both the input and output arrays.

Folding by means of an intermediary diffraction grating utilizes a large but inexpensive intermediary grating which rediffracts diffracted beams. Thus, the large and costly input and output grating and their associated transducers can be replaced by much smaller units. In addition to the resulting cost savings and higher impedance levels permitted because of the smaller transducers the folded structure provides a higher level of redundancy of beam paths than the equivalent unfolded delay line.

According to the principles discussed above, a multiply folded perpendicular diffraction delay line may be designed and for each intermediary grating there is a distinct parameter equal to the ratio of the sines of the angles of diffraction to incidence for each grating. Referring to FIG. 4 there is shown by way of example, a schematic illustration of the grating positions in a double fold perpendicular diffraction delay line.

For all embodiments of the invention, the construction and mounting of the gratings and transducers according to the above-described design may be accomplished by any of the well known methods, such as photoetching the gratings and epoxy bonding the transducers to the propagating material, which are conventionally employed in the fabrication of unfolded diffraction delay lines. Similarly, conventional techniques may be used where undesired diffraction orders are not cut off completely. An absorbing means can be provided, such as by beveling the unused edges and placing absorbing material on the upper and lower surfaces of the block of propagating material, to dampen the waves reflected by the beveling and thus reduce spurious signals.

Though for the purposes of explanation, this invention has been described and illustrated in terms of reflecting intermediary gratings, it is clearly understood that transmitting gratings may also be employed as the intermediary grating.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

I claim:

1. A diffraction delay line of the type having a body of propagating material and a plurality of graded arrays arranged to produce a plurality of sets of diffracted beams each of said plurality of sets consisting of a plurality of beams of the same frequency, said same frequency being different from the frequency of beams in all other of said sets, and disposed to propagate in a single propagating plane within said body the diffracted beams of all of said sets such that all beams of any one of said sets travel nonparallel paths having the same path length, said same path length being different from the length of any path traveled by a diffracted beam of any other of said sets, characterized in that means for launching and receiving elastic wave energy are associated respectively with a first and second array of said plurality of arrays and a third array of said plurality of arrays is arranged to intercept said each diffracted beam propagating from said first array in said single propagating plane and to rediffract in said single propagating plane said intercepted beams toward said second array at an angle different from said each diffracted beam's angle of incidence upon said third array.

2. A diffraction delay line of claim 1 wherein each of the elements of said third array intercepting diffracted beams from said first array lies in a plane which is positioned normal to the plane containing the elements of said first array.

3. A diffraction delay line of claim 1 wherein said third array is remote from any means for launching or receiving elastic wave energy.

4. A diffraction delay line of claim 1 wherein said third array is a reflecting array and is positioned on an exterior edge of said body of propagating material and rediffracted beams incident upon it back into said body.

5. A diffraction delay line of claim 1 wherein each element of said third array lies in a plane perpendiuclar to a plane in which each element of both said first and second arrays lies.

6. A perpendicular diffraction delay line of the type having a body of propagating material, two electric signal to elastic wave transducers bonded to said material, a grating affixed to each of said transducers, said diffraction gratings being proportioned to direct beams along beam paths according to their frequency content such that a plurality of beams of like frequency travel equal distances from input to output along nonparallel paths in a single plane and beams of different frequency travel paths of different distances from input to output in the same single plane, characterized in that an intermediary mechanical graded grating is positioned orthogonal to the same single plane to intercept each of said paths and is proportioned to rediffract each beam from said input incident upon said intermediary grating to said output at an angle such that $0 < k < 1$ where $k$ is the ratio of the sine of the angle of diffraction to the sine of the angle of incidence relative to said intermediary grating.

7. A diffraction delay line of the type having an input array of N elements, an output array of M elements and a redirecting surface arranged to intercept beams in a propagating plane from said input array and redirect in said propagating plane said beams to said output array, characterized in that approximately NM exactly inphase paths are provided by including a plurality of discontinuities on said surface, said plurality being larger than N or M, and said plurality of discontinuities being positioned to redirect each of said beams at an angle different from the beam's angle of incidence relative to said surface.

References Cited

UNITED STATES PATENTS

| 3,387,233 | 6/1968 | Parker | 333—30 |
| 3,378,793 | 4/1968 | Mortley | 333—30 |
| 3,401,360 | 9/1968 | Schulz-Dubois | 333—30 |
| 3,300,739 | 1/1967 | Mortley | 333—30 |

HERMAN K. SAALBACH, Primary Examiner

C. BARAFF, Assistant Examiner

U.S. Cl. X.R.

310—9.5; 333—72